(12) United States Patent
Palaganas et al.

(10) Patent No.: US 10,805,580 B2
(45) Date of Patent: *Oct. 13, 2020

(54) REMOTE DISPLAY OF SATELLITE RECEIVER INFORMATION

(71) Applicant: The DIRECTV Group, Inc., El Segundo, CA (US)

(72) Inventors: Charles P. Palaganas, Cerritos, CA (US); Terence Wu, Torrance, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 73 days.

This patent is subject to a terminal disclaimer.

(21) Appl. No.: 15/861,331

(22) Filed: Jan. 3, 2018

(65) Prior Publication Data

US 2018/0146172 A1 May 24, 2018

Related U.S. Application Data

(63) Continuation of application No. 15/341,816, filed on Nov. 2, 2016, now Pat. No. 9,888,217, which is a (Continued)

(51) Int. Cl.
*H04N 7/20* (2006.01)
*H01Q 1/12* (2006.01)
(Continued)

(52) U.S. Cl.
CPC .............. *H04N 7/20* (2013.01); *H01Q 1/125* (2013.01); *H01Q 1/1257* (2013.01);
(Continued)

(58) Field of Classification Search
CPC .......... H04N 21/6143; H04N 21/6193; H04N 21/485; H04N 5/4403; H04N 7/20; H01Q 1/125; H01Q 1/1257
See application file for complete search history.

(56) References Cited

U.S. PATENT DOCUMENTS 5,313,215 A 5/1994 Walker et al.
5,463,403 A 10/1995 Walker et al.
(Continued)

FOREIGN PATENT DOCUMENTS

CN 1700516 A 11/2005
EP 0548844 B1 11/1997

*Primary Examiner* — James R Sheleheda
(74) *Attorney, Agent, or Firm* — Guntin & Gust, PLC; Mark Wilinski

(57) ABSTRACT

An example implementation may include a first device identifying a request from a second device for an instruction for aligning a satellite antenna. The first device may obtain satellite receiver data of a satellite receiver, responsive to the request. Based on the satellite receiver data, the instruction requested for aligning the satellite antenna is determined. The instruction includes determining a number of other satellite antenna angles for aligning the satellite antenna with other satellites, determining a satellite angle based on the other satellite antenna angles, and determining the instruction requested for aligning the satellite antenna based on the satellite angle. The satellite receiver data, including the instruction requested for aligning the satellite antenna, is provided by the first device to the second device.

20 Claims, 9 Drawing Sheets

Related U.S. Application Data continuation of application No. 14/586,777, filed on Dec. 30, 2014, now Pat. No. 9,521,378.

(51) Int. Cl.
*H04H 40/90* (2008.01)
*H04N 21/61* (2011.01)
*H04N 21/485* (2011.01)
*H04N 21/435* (2011.01)

(52) U.S. Cl.
CPC .......... *H04H 40/90* (2013.01); *H04N 21/435* (2013.01); *H04N 21/485* (2013.01); *H04N 21/6143* (2013.01)

(56) References Cited

U.S. PATENT DOCUMENTS

| | | | |
|---|---|---|---|
| 5,760,739 A | 6/1998 | Pauli et al. | |
| 5,808,583 A | 9/1998 | Roberts et al. | |
| 5,978,716 A | 11/1999 | Kamel et al. | |
| 6,031,507 A | 2/2000 | Aoki et al. | |
| 6,535,177 B1 | 3/2003 | Dhellemmes et al. | |
| 6,538,612 B1 | 3/2003 | King et al. | |
| 6,600,730 B1 | 7/2003 | Davis et al. | |
| 6,686,889 B1 | 2/2004 | Kwon et al. | |
| 6,693,587 B1 | 2/2004 | Kuether et al. | |
| 6,937,188 B1 | 8/2005 | Saunders et al. | |
| 7,016,643 B1 | 3/2006 | Kuether et al. | |
| 7,595,764 B2 | 9/2009 | Shuster et al. | |
| 7,636,067 B2 * | 12/2009 | Norin | H01Q 3/08 342/359 |
| 7,663,543 B2 * | 2/2010 | Norin | H01Q 1/1257 342/356 |
| 8,044,872 B2 * | 10/2011 | Stroes | H01Q 1/1257 343/757 |
| 8,260,567 B1 | 9/2012 | Kaplan et al. | |
| 8,296,096 B2 | 10/2012 | Kirby | |
| 8,554,466 B2 | 10/2013 | Hsu et al. | |
| 8,837,782 B1 | 9/2014 | Rosenwinkel et al. | |
| 8,982,004 B1 * | 3/2015 | Santoru | H01Q 1/1257 343/757 |
| 9,281,559 B2 | 3/2016 | Ransom et al. | |
| 9,451,220 B1 * | 9/2016 | Wu | H04N 7/20 |
| 9,521,378 B1 * | 12/2016 | Palaganas | H04N 7/20 |
| 9,888,217 B2 * | 2/2018 | Palaganas | H04N 7/20 |
| 2002/0000931 A1 | 1/2002 | Petronic et al. | |
| 2002/0084941 A1 | 7/2002 | Matz et al. | |
| 2003/0016172 A1 | 1/2003 | Natsume et al. | |
| 2004/0128689 A1 * | 7/2004 | Pugel | H01Q 1/125 725/72 |
| 2005/0113032 A1 * | 5/2005 | Adam | H01Q 1/1257 455/67.11 |
| 2006/0020978 A1 | 1/2006 | Miyagawa et al. | |
| 2007/0080861 A1 * | 4/2007 | Norin | H01Q 1/1257 342/359 |
| 2007/0150923 A1 * | 6/2007 | Okamoto | H01Q 1/125 725/72 |
| 2008/0018995 A1 | 1/2008 | Baun et al. | |
| 2008/0165070 A1 | 7/2008 | Stroes et al. | |
| 2009/0033576 A1 * | 2/2009 | Smoyer | H01Q 1/125 343/761 |
| 2013/0127665 A1 | 5/2013 | Miller et al. | |
| 2013/0135146 A1 | 5/2013 | Ransom et al. | |
| 2013/0271319 A1 * | 10/2013 | Trerise | H01Q 1/125 342/359 |
| 2014/0315599 A1 | 10/2014 | Teichmann et al. | |
| 2015/0026737 A1 | 1/2015 | Miller et al. | |
| 2015/0219744 A1 | 8/2015 | Eikenberry et al. | |
| 2015/0257126 A1 | 9/2015 | Herz | |
| 2015/0263408 A1 * | 9/2015 | Hirabe | H01Q 1/1228 343/894 |
| 2015/0365731 A1 * | 12/2015 | Miller | H01Q 3/08 725/72 |
| 2016/0036117 A1 | 2/2016 | Whitley et al. | |
| 2016/0056525 A1 | 2/2016 | Hansryd et al. | |
| 2017/0070708 A1 | 3/2017 | Palaganas | |

\* cited by examiner

REMOTE DISPLAY OF SATELLITE RECEIVER INFORMATION

CROSS-REFERENCE TO RELATED APPLICATIONS

This application is a continuation of U.S. patent application Ser. No. 15/341,816, filed Nov. 2, 2016, which is a continuation of and claims priority to U.S. patent application Ser. No. 14/586,777, filed Dec. 30, 2014. The contents of the foregoing are hereby incorporated by reference into this application as if set forth herein in full.

This application is also related to the following co-owned application, entitled "System and Method for Aligning a Multi-Satellite Receiver Antenna", U.S. patent application Ser. No. 14/586,804, filed on Dec. 30, 2014. The contents of the foregoing are hereby incorporated by reference into this application as if set forth herein in full.

BACKGROUND

Satellite broadcasting of information may involve substantial infrastructure to deliver signals to terrestrial satellite receivers. For example, a plurality of ground-based microwave transmitters may transmit information to a plurality of satellites along a communication uplink. The plurality of satellites may be in geostationary orbit in a corresponding plurality of orbital slots. Each satellite may retransmit the information toward ground locations as one or more satellite transponder signals via a radio frequency communication downlink. A satellite antenna, or outdoor unit (ODU), usually mounted to a building housing the satellite receiver, may receive the one or more satellite transponder signals. Such ODUs are commonly used at both residential and commercial venues to receive satellite television service.

To receive the satellite transponder signals at their various orbital slots, the ODU must be correctly aligned along the correct azimuth, elevation, and tilt angles, depending on the geographic location of the ODU. Current methods for aligning ODUs tend to be complicated, and are generally only carried out by specialized technicians using a specialized signal meter that contains satellite downlink information on which the alignment process may be based. The signal meter is typically connected directly to the ODU via a coaxial connection. The technician then proceeds through the course alignment process, followed by the fine alignment process, which may require a multitask procedure of monitoring the signal meter while simultaneously rotating the ODU and recording the rotations, as well as performing manual calculations.

Further, satellite downlinks change over time due to capacity increases, modulation standards, geographical service areas, and installation verification thresholds. This in turn may affect the desired alignment for a given ODU. Because of this, a standalone signal meter, which might not be network connected, requires manual updating to avoid improper ODU alignment.

SUMMARY

The present disclosure generally relates to the generation and remote display of information from a satellite receiver, and in particular, the generation and display of information to facilitate the installation and alignment of a satellite antenna, or outdoor unit (ODU). For instance, example embodiments may provide a graphical user-interface (GUI) that assists a home user in the process of installing and aligning an ODU at their home. These as well as other aspects, advantages, and alternatives will become apparent to those of ordinary skill in the art by reading the following detailed description, with reference where appropriate to the accompanying drawings.

In one aspect, a method is provided. The method may include (i) receiving, via a user interface of a first computing device, an input indicating a request for satellite receiver data, where the input further indicates a request for an instruction for aligning a satellite antenna; (ii) transmitting, from the first computing device to a second computing device, the request for the satellite receiver data, where the second computing device is communicatively connected to the satellite antenna; (iii) receiving, by the first computing device from the second computing device, the satellite receiver data; and (iv) causing, by the first computing device, an indication of the satellite receiver data to be displayed on a graphical display of the first computing device, where the indication of the satellite receiver data includes an indication of the instruction for aligning the satellite antenna.

In another aspect, a method is provided. The method may include (i) receiving, by a first computing device from a second computing device, a request for satellite receiver data, where the request for the satellite receiver data includes a request for an instruction for aligning a satellite antenna, and where the first computing device is communicatively connected to the satellite antenna; (ii) receiving, by the first computing device, the satellite receiver data; (iii) based on the received satellite receiver data, determining an instruction for aligning the satellite antenna; and (iv) transmitting, by the first computing device to the second computing device, the satellite receiver data, wherein the satellite receiver data includes the instruction for aligning the satellite antenna.

In another aspect, a first computing device is provided. The first computing device may include (i) a communications interface; (ii) a processor; (iii) a non-transitory computer readable medium; and (iv) program instructions stored on the non-transitory computer readable medium that, when executed by the processor, cause the first computing device to perform functions including (a) receiving, by the first computing device from a second computing device, a request for satellite receiver data, where the request for the satellite receiver data comprises a request for an instruction for aligning a satellite antenna, and where the first computing device is communicatively connected to the satellite antenna; (b) receiving, by the first computing device, the satellite receiver data; (c) based on the received satellite receiver data, determining an instruction for aligning the satellite antenna; and (d) transmitting, by the first computing device to the second computing device, the satellite receiver data, where the satellite receiver data comprises the instruction for aligning the satellite antenna.

Other aspects, embodiments, and implementations will become apparent to those of ordinary skill in the art by reading the following detailed description, with reference where appropriate to the accompanying drawings.

DETAILED DESCRIPTION

Figure 1:
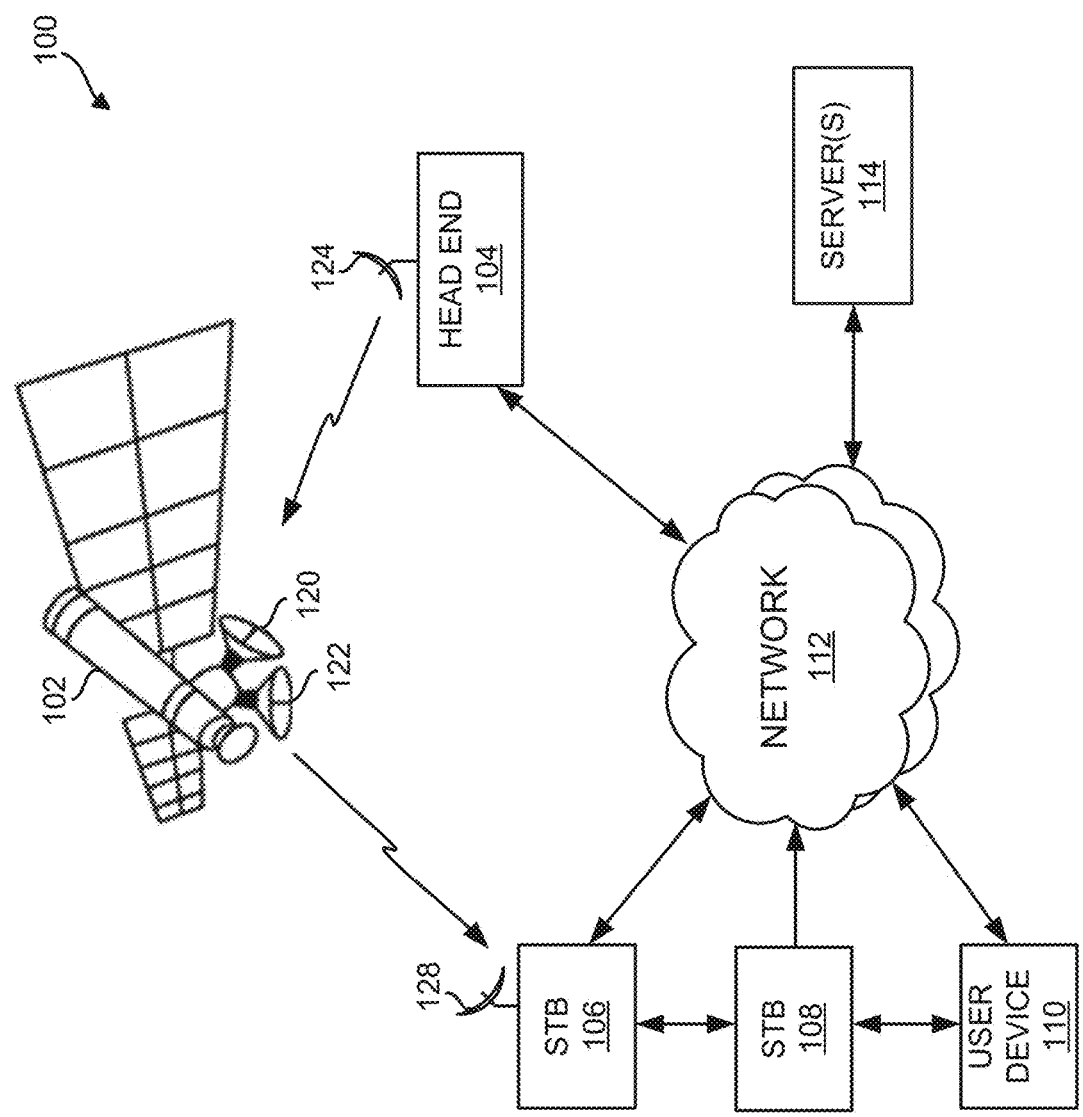
FIG. 1 is a simplified block diagram that illustrates a communication system, according to an example embodiment.

The following detailed description includes references to the accompanying figures. In the figures, similar symbols typically identify similar components, unless context dictates otherwise. The example embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein and illustrated in the figures can be arranged, substituted, combined, separated, and designed in a wide variety of different configurations, all of which are contemplated herein.

I. Overview

Embodiments are provided herein to facilitate the remote display of satellite receiver information, which may be used to facilitate the installation and alignment of a satellite antenna, or outdoor unit (ODU). Further, an example embodiment may allow an end user to perform a "do it yourself" alignment of an ODU using existing computing devices. This in turn may reduce the need for specialized equipment and personnel, and thus may reduce the overall cost of ODU installations. While the examples herein are generally focused on the installation and alignment of an ODU, the displayed satellite information may be used for other purposes as well.

In some cases, a typical set-top box (STB) may include the necessary hardware to obtain signal measurements from an ODU. However, aligning the ODU based on information from the STB is generally not practical, as STBs and any connected displays (e.g., a TV) are typically installed in living rooms, while ODUs are installed outdoors, typically on rooftops. Consequently, satellite receiver data from the STB may be provided to a remote computing device, which may display the information on a graphical display, for use in aligning the ODU.

In some examples, the remote computing device may be a computing device that an end user may already possess, such as a smartphone, a tablet computer, a laptop computer, wearable computing device, etc. The computing device may be connected to and communicate with the STB via a local network, such as a home WiFi network. The computing device may transmit requests for satellite receiver data, including requests for instructions for aligning the ODU.

A server, such as an HTTP server, may receive and store satellite receiver data from the ODU for transmission to the computing device. For example, the server may be embedded as part of the STB, or it may be an external server that is connected to the STB via a network such as the internet, and may communicate with the ODU via the STB.

The server may also host an application that is configured to determine instructions for aligning the ODU based on the received satellite receiver data, such as a measured signal level. For example, the instructions for a coarse alignment of the ODU may be relatively straightforward, and may include an instruction to rotate the ODU in one of the azimuth, elevation, or tilt directions until a peak signal level is measured.

The application may further include a process that utilizes simultaneous signal readings from multiple satellites to determine fine adjustments for the ODU during an alignment process. These instructions may then be relayed to the computing device for display on a graphical display. Such a process is discussed in more detail in the concurrently filed application that has been incorporated by reference herein it its entirety, but generally involves using multiple satellites as anchoring points by taking measurements at three or four different ODU orientations.

Between each measurement, instructions are provided via the graphical display of the computing device to rotate the ODU by turning a fine adjustment screw a prescribed number of turns. Each measurement includes a signal power measurement for each satellite used as an anchoring point. Thus, for each satellite, at least three signal power measurements at three different orientations of the ODU are obtained.

Once the measurements are obtained, for each satellite, the three collected measurements are used to determine an antenna pattern, which is typically a parabola. After determining the ODU antenna pattern for each satellite link, a peak angle for each satellite is calculated by determining the peak of the calculated antenna pattern parabola. Once the multiple satellite peak angles are calculated, an average peak angle can be determined based on the calculated satellite peak angles. An instruction is then determined for rotating the ODU to the average peak angle, which in turn completes fine alignment of the ODU with multiple satellites.

This simplified approach to aligning an ODU may be less complex, requiring fewer steps, less equipment, and less hardware support while retaining the same operation and achieving the same outcome.

It should be understood that the above examples are provided for illustrative purposes, and should not be construed as limiting.

II. Example Communication System and Associated Devices

Referring now to the figures, FIG. 1 is a simplified block diagram that illustrates a communication system 100 in which embodiments of the disclosed methods and entities can be implemented. The communication system 100 may include a satellite 102, a head end 104, one or more set-top boxes (STBs) 106, 108, one or more user devices 110, one or more networks 112, and one or more servers 114, such as a message handler server, a billing system server, a customer service center server, a call placement system server, and an ODU alignment server, among other examples. Other devices may also be included in the communication system 100. It should be understood that, although not illustrated, multiple satellites, head ends, servers, and other components might be included in the communication system 100. Moreover, while multiple components are illustrated separately, it should be understood that one or more of the components may be implemented as distributed components.

Satellite 102 may include one or more antennas 120, 122 configured to send and receive digital or analog signals to one or more devices in the communication system 100. For instance, satellite 102 may include a first antenna 120 configured to receive data via an uplink signal from a device, such as head end 104. Satellite 102 may also include a second antenna 122 that may transmit data via a downlink signal to a receiving device. The receiving device may be a mobile device or a stationary device. Set-top boxes 106, 108 or user device 110 may be a mobile device or a stationary device. In some examples, a single antenna may be used to receive data via an uplink signal and transmit data via a downlink signal. Other examples are also possible.

Head end 104 may include a transmitting antenna 124 for communicating data using one or more signals. For instance, transmitting antenna 124 may send signals to the antenna 120 at satellite 102. Satellite 102 may in turn send downlink signals to a receiving device, such as set-top box 106. In another instance, head end 104 may communicate data to set-top box 106 via a network 112. Network 112 may be representative of one or more types of networks, such as a public switched telephone network, the Internet, a mobile telephone network, or other type of network.

Set-top boxes 106, 108 are examples of receiving devices configured to receive data from satellite 102 or network 112. For example, set-top box 106 may include or be connected to an antenna, or outdoor unit (ODU), 128 for receiving downlink signals from antenna 122. Set-top box 106 may also include one or more components structured and arranged to receive signals from network 112. The type, content, and number of signals received by set-top box 106 may vary. For instance, the signals may be media signals that may include video or audio signals. Data sent via the media signals may include content, program data, images, requests, or the like. Accordingly, set-top boxes 106, 108 may each comprise a DVR or other device for recording and storing digital content or other such data. Other examples are also possible.

In some examples, set-top boxes 106, 108 may be interconnected with one or more devices in the communication system 100 via a local network (not illustrated). The local network, which may be a wired network or wireless network, may be used to interconnect set-top boxes 106, 108 within a household, multi-dwelling unit, or commercial building. The local network may also allow for multi-room viewing of content stored on a first set-top box (such as set-top box 106) and communicated to a second set-top box (such as set-top box 108) through the local network. The stored content can comprise content a set-top box 106 receives from antenna 128.

User device 110 may include a variety of stationary or mobile computing devices. For example, user device 110 may include a landline telephone, cellular telephone, smartphone, personal computer, laptop computer, tablet computer, personal digital assistant (PDA), portable media player, a wearable computing device, or other computing device now known or later developed. User device 110 may be configured to send or receive data in a variety of ways. For example, user device 110 may receive downlink signals from antenna 122. In another example, user device 110 may send or receive signals from network 112. In yet another example, user device 110 may send or receive signals from one or more devices in the communication system 100. For instance, user device 110 may send or receive signals from set-top boxes 106, 108 via network 112 or a local network. Other examples are also possible.

In some examples, user device 110 may be a mobile computing device such as a wearable computing device, a smartphone, tablet computer, or laptop computer that can be used to perform various operations in accordance with satellite TV services. For instance, user device 110 may support mobile applications that allow a user to remotely access and manage features and services that the user has subscribed to. By way of example, mobile applications may enable the user to remotely view TV programs on user device 110, and/or may enable the user to remotely schedule, add, delete, edit, or otherwise manage DVR recordings from user device 110. To facilitate such operations in practice, user device 110 may be linked communicatively, via a local network or other type of wired or wireless network, with one or more set-top boxes owned and maintained by a user, such as set-top box 108 as shown in FIG. 1. Other examples are possible as well.

Figure 2:
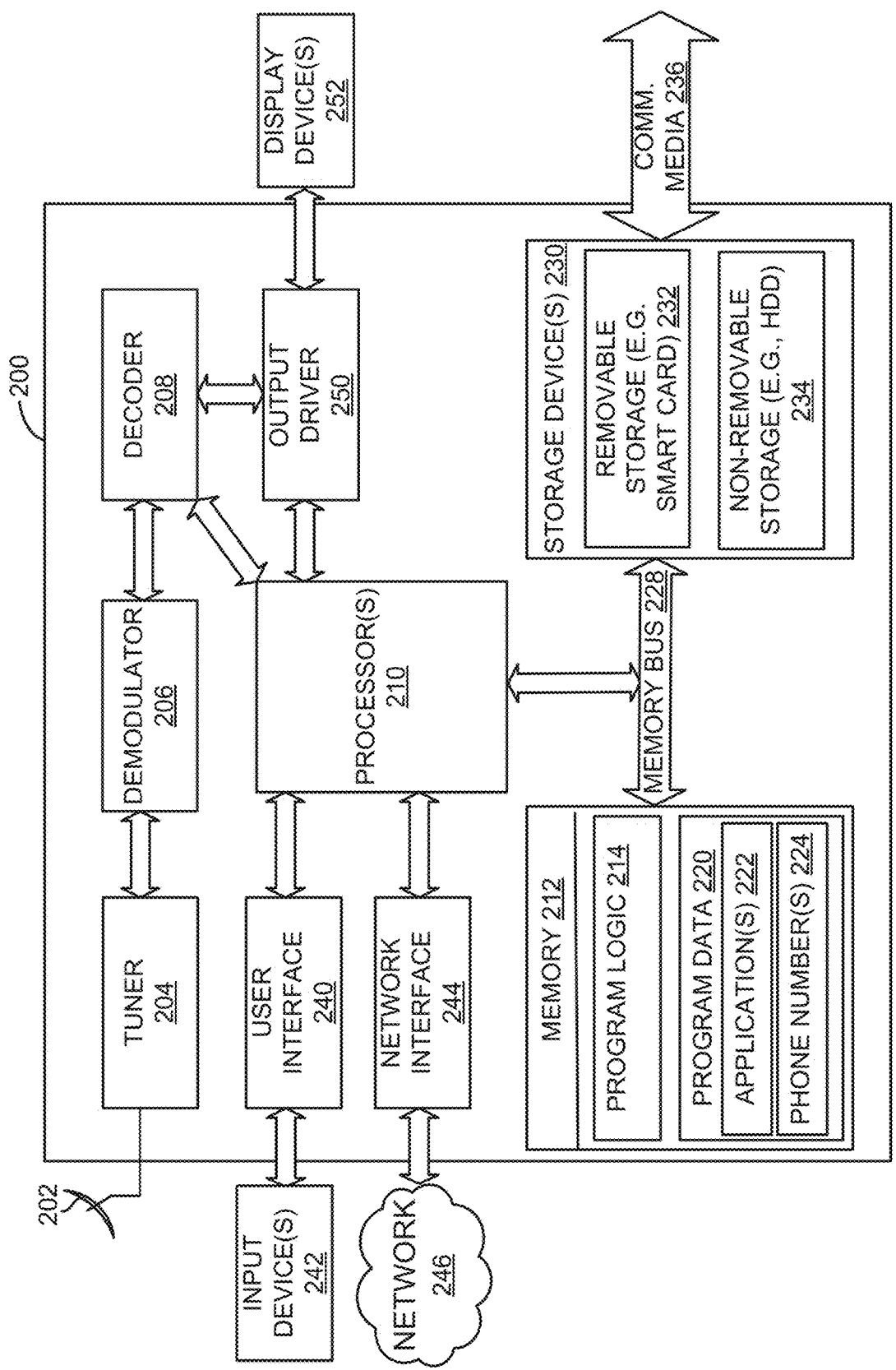
FIG. 2 is a functional block diagram that illustrates a computing device used in a communication system, according to an example embodiment.

FIG. 2 is a functional block diagram that illustrates a computing device 200 used in a communication system in accordance with embodiments described herein. Computing device 200 may take a variety of forms. For example, computing device 200 may comprise or be arranged as a set-top box (such as set-top boxes 106, 108 of FIG. 1), and may further comprise a DVR or other digital content recording device. The set-top box may be used for television or other media. As another example, computing device 200 may comprise or be arranged as a landline or cellular telephone, smartphone, personal computer, laptop computer, tablet computer, personal digital assistant (PDA), portable media player, a wearable computing device, or other computing device now known or later developed.

Computing device 200 may include an antenna 202, a tuner 204, a demodulator 206, a decoder 208, one or more processors 210, a memory 212, one or more storage devices 230, a user interface 240, a network interface 244, and an output driver 250. Although, a particular configuration of computing device 200 is illustrated, the configuration is merely representative of various possible receiving devices. For example, although only one tuner 204, one demodulator 206, and one decoder 208 are illustrated, multiple tuners, demodulators, or decoders may be provided within computing device 200. The components described in FIG. 2 may be communicatively linked by a system bus, network, or other connection mechanism.

Antenna 202 may be one of a number of different types of antennas that may include one or more low noise blocks downconverters (LNB) associated therewith. For instance, antenna 202 may be a single antenna for receiving signals from a satellite (such as satellite 102 of FIG. 1), network (such as network 112 of FIG. 1), or terrestrial source. In another instance, antenna 202 may include multiple antennas for different orbital slots. In yet another instance, signals and other items described as being received by antenna 202 can be received by network interface 244 by way of a coaxial cable or other communication link. In that regard, one or more signals or items received at network interface 244 can be forwarded to tuner 204.

Tuner 204 may receive a signal from antenna 202. The signal may be a media signal that may include video or audio signals. The signal may also include a television signal. The content of the signal may vary based on the type of signal. For example, the content may include television programming content, program guide data or other types of data. Tuner 204 may then communicate the signal to demodulator 206.

Demodulator 206 may receive the signal and demodulate the signal to form a demodulated signal. Decoder 208 may decode the demodulated signal to form a decoded signal or decoded data. The decoded signal may then be sent to processor 210 or output driver 250. However, other examples are also possible.

Processor 210 may be any type of processor, such as a microprocessor, a microcontroller, a digital signal processor (DSP), multicore processor, etc. Processor 210 may be used to coordinate or control tuner 204, demodulator 206, decoder 208, and any other components of computing device 200 that may or may not be illustrated in FIG. 2. In some implementations, processor 210 may include an internal memory controller (not illustrated). Yet other implementations may include a separate memory controller that can be used with processor 210.

A memory bus 228 can be used for communicating between the processor 210 and memory 212. Memory 212 may be any suitable type of memory. For example, memory 212 may include a non-transitory computer-readable medium, for example, such as computer-readable media that stores data for short periods of time like solid-state memory, flash drives, register memory, processor cache and RAM. The computer-readable medium may also or alternatively include non-transitory media, such as secondary or persistent long-term storage, like read only memory (ROM), optical or magnetic disks, compact disc read only memory (CD-ROM), for example. The computer-readable medium may also be any other volatile or non-volatile storage system. The computer-readable medium may, for example, be considered a computer-readable storage medium, a tangible storage device, or other article of manufacture.

Memory 212 may include program logic 214 and program data 220. Program logic 214 may include programming instructions, such as computer executable or logic-implemented instructions. In some examples, the programming instructions may be provided or otherwise obtainable in a downloadable format, such as via network 246 (which may be illustrated as network 112 in FIG. 1). Program data 220 may include program information that can be directed to various data types. For instance, program data 220 may include one or more applications 222 that may execute one or more processes to provide input data to computing device 200, in accordance with the present disclosure. Program data 220 may also include data (such as phone numbers 224 or customer account information) that may be stored in memory 212 at computing device 200.

In some implementations, memory 212 may be distributed between one or more locations. For example, at least a portion of memory 212 may reside within processor 210. In another example, all or part of memory 212 may reside on a storage device 230. Storage device 230 may include removable storage devices 232, non-removable storage devices 234, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), memory cards, smart cards and tape drives to name a few. Computer storage media can include volatile and nonvolatile, transitory, non-transitory, removable and non-removable media implemented in any method or technology for storage of information, such as computer-readable instructions, data structures, program modules, or other data.

Computing device 200 may also include a user interface 240 that is configured to allow a customer to interact with computing device 200 via one or more input devices 242. Examples of input device 242 may include a remote control (or more simply, a remote), keyboard, a computer mouse, one or more push buttons, a touch screen, a smartphone, a tablet computer, a voice or gesture activated interface, or the like. Input device 242 may be used, for example, to select a channel, select information, change the volume, change the display appearance, or other functions using user interface 240. The process of making a selection with input device 242 may take a variety of forms, such as an action by a customer.

Computing device 200 may include network interface 244 for communicating data through one or more networks 246. Network interface 244 may take a variety of forms. For example, network interface 244 may be a WiFi, WiMax, WiMax mobile, data over cable service interface specification (DOCSIS), Bluetooth, ZigBee, Multimedia over Coaxial (MoCA), wireless, cellular, or other types of interfaces. Moreover, network interface 244 may use a variety of protocols for communicating via the network 246. For instance, network interface 244 may communicate using Ethernet, a Transmission Control Protocol/Internet Protocol (TCP/IP), a hypertext transfer protocol (HTTP), or some other protocol.

Computing device 200 may be coupled to a display 252. Display 252 may be a television, monitor, or other device configured to display images. The images may be video, graphics, text, or any variety of other visual representations. In some examples, the display 252 may include an audio output, such as a loudspeaker, to generate sound waves from media signals received by display 252.

Display 252 may communicate with an output driver 250 within computing device 200 to facilitate communication between computing device 200 and display 252. In some implementations, output driver 250 may work in conjunction with a graphics processing unit (not illustrated), which can be configured to communicate with display device 252. Output driver 250 can communicate with display device 252 by a high-definition multiple interface (HDMI) cable, a coaxial cable, some other wired communication link, or wirelessly.

In some examples, computing device 200 may communicate directly or indirectly with one or more additional devices using a communication media 236. A communication connection is one example of a communication media 236. Communication media 236 may be embodied by computer-readable instructions, data structures, program modules, or other data in a modulated data signal, such as a carrier wave or other transport mechanism. The communication media 236 may also include wireless, optical, or other information delivery media. A modulated data signal can be a signal that has one or more of its characteristics set or changed in such a manner to encode information in the signal. By way of example, and not limitation, communication media 236 can include wired media such as a wired network or direct-wired connection, and wireless media such as acoustic, radio frequency (RF), infrared (IR) or other wireless media. The communication may include a cellular or cellular data connection, a satellite data connection, etc.

Figure 3:
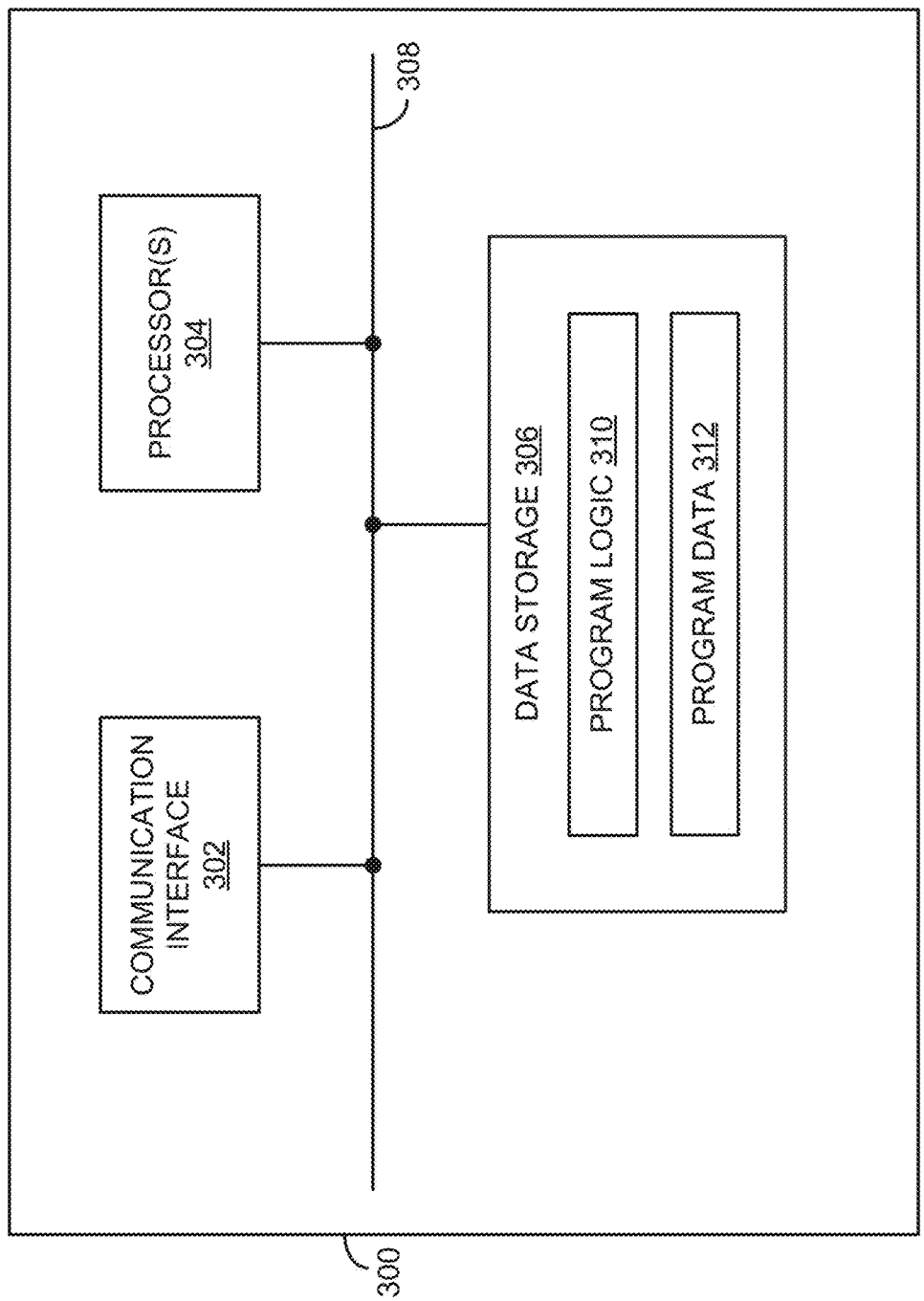
FIG. 3 is a functional block diagram that illustrates a server used in a communication system, according to an example embodiment.

FIG. 3 is a functional block diagram that illustrates a server 300 used in a communication system (such as server 114 in FIG. 1) in accordance with embodiments described herein. Server 300 may include a communication interface 302, a processor 304, and a data storage 306, all of which may be communicatively linked together by a system bus, network, or one or more other connection mechanisms 308. Although not shown, server 300 may also include other components, such as external storage. It should also be understood that the configuration or functionality of server 300 may be distributed or subdivided between a plurality of entities, such as multiple servers. Further, it should be understood that some of the functions described herein may be carried out by an entity other than a server.

In server 300, the communication interface 302 may comprise one or more structures, and associated equipment, for receiving data from one or more sources and distributing data to a group of one or more destinations. For instance, communication interface 302 may be configured to receive a request from one or more entities (such as a set-top box) and add the request in a queue based on data associated with the request. The communication interface 302 may also be configured to provide for a communication to occur once the request is de-queued or otherwise processed.

Processor 304 may comprise one or more processors, such as general-purpose processors (e.g., a microprocessor), special-purpose processors (e.g., an application-specific integrated circuit (ASIC) or digital-signal processor (DSP)), programmable-logic devices (e.g., a field programmable gate array (FPGA)), or any other processor components now known or later developed. Processor 304 may be integrated in whole or in part with other components of server 300.

Data storage 306 may be a non-transitory computer-readable medium. For example, data storage 306 may take the form of one or more volatile or non-volatile storage components, such as magnetic, optical, or organic storage components, integrated in whole or in part with a processor 306. As further shown, data storage 306 may include program logic 310 or program data 312. Program logic 310 may include, for example, machine language instructions executable by processor 304 to carry out various functions, such as the functionality of the methods and systems described herein. Program data 312 may include one or more types of data deemed suitable for a given implementation. For example, program data 312 may include program information that can be directed to various data types (such as queues). Program data 312 may also include data (such as digital video content and/or database tables relating to customer information) that may be stored in memory.

In some embodiments, server 300 may be configured to manage multiple set-top boxes or other computing devices associated with a particular network. For instance, a user may have multiple set-top boxes in the user's home, and server 300 may relay messages from one set-top box to another, and/or may relay messages transmitted from a computing device such as a smartphone to one or more set-top boxes in the user's local network. As such, server 300 may propagate changes the user has made to settings of (and/or recordings made to) of one set-top box to one or more other set-top boxes in the local network. Server 300 may be configured to perform other operations as well.

Figure 4:
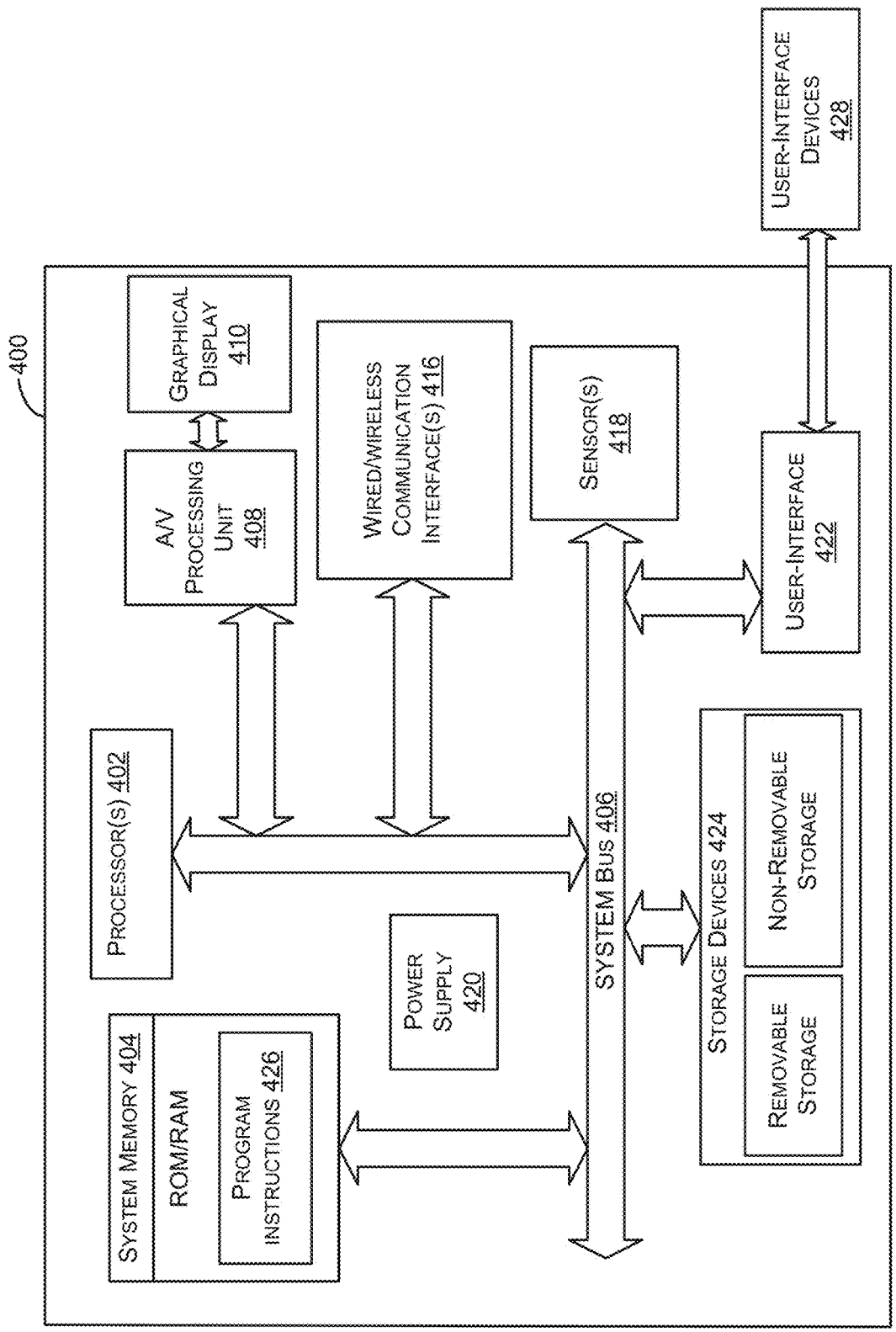
FIG. 4 is a functional block diagram that illustrates another computing device used in a communication system, according to an example embodiment.

FIG. 4 is a functional block diagram that illustrates a computing device 400 in accordance with some embodiments described herein. The computing device 400 may be a user device, such as the user device 110 shown in FIG. 1. Computing device 400 may include at least one processor 402 and system memory 404. In an example embodiment, computing system 400 may include a system bus 406 that communicatively connects processor 402 and system memory 404, as well as other components of computing device 400. The system memory 404 can be of any type of memory now known or later developed including but not limited to volatile memory (such as RAM), non-volatile memory (such as ROM, flash memory, etc.) or any combination thereof.

An example computing device 400 may include various other components as well. For example, computing device 400 includes an A/V processing unit 408 for controlling graphical display 410, one or more communication interfaces 416, and a power supply 420. Graphical display 410 may be arranged to provide a visual depiction of various input regions provided by user-interface module 422. User-interface module 422 may be further configured to receive data from and transmit data to (or be otherwise compatible with) one or more user-interface devices 428, such as a keyboard, a mouse, among other examples.

Computing device 400 may include one or more sensors 418, which may gather data related to the computing device. The sensor(s) may include a global-positioning system (GPS) transceiver, one or more accelerometers, an inertial measurement unit (IMU), a compass, a speaker, and a camera. Other sensors are also possible. Furthermore, computing device 400 may also include one or more data storage devices 424, which can be removable storage devices, non-removable storage devices, or a combination thereof.

The computing device 400 may also include program instructions 426 that are stored in system memory 404 (and/or possibly in another data-storage medium) and executable by processor 402 to facilitate various operations. Although various components of computing device 400 are shown as distributed components, it should be understood that any of such components may be physically integrated and/or distributed according to the desired configuration of the computing system.

III. Example Methods for the Remote Display of Satellite Receiver Information

Example implementations are discussed below for facilitating the remote display of satellite receiver information. Flow charts 500 and 700, shown in FIGS. 5 and 7 respectively, present example operations that may be implemented in the communications system 100 shown in FIG. 1. Flow charts 500 and 700 may include one or more operations or actions as illustrated by one or more of the blocks shown in each figure. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, the flow charts 500 and 700 and other operations disclosed herein provide the operation of possible implementations. In this regard, each block may represent a module, a segment, or a portion of program code, which includes one or more instructions executable by a processor for implementing specific logical operations. The program code may be stored on any type of computer readable medium, for example, such as a storage device including a disk or hard drive. In addition, each block may represent circuitry that is wired to perform the specific logical operations.

Further, although network technologies and topologies may differ in different implementations, the general concept of transmitting satellite receiver data remains the same. The same may be true for the implementation of protocols used to host and request information. The examples herein contemplate an HTTP client/server architecture used in conjunction with both wired and wireless networking interfaces, although numerous other examples are possible.

A. First Example Method for Remote Display of Satellite Receiver Information

Figure 5:
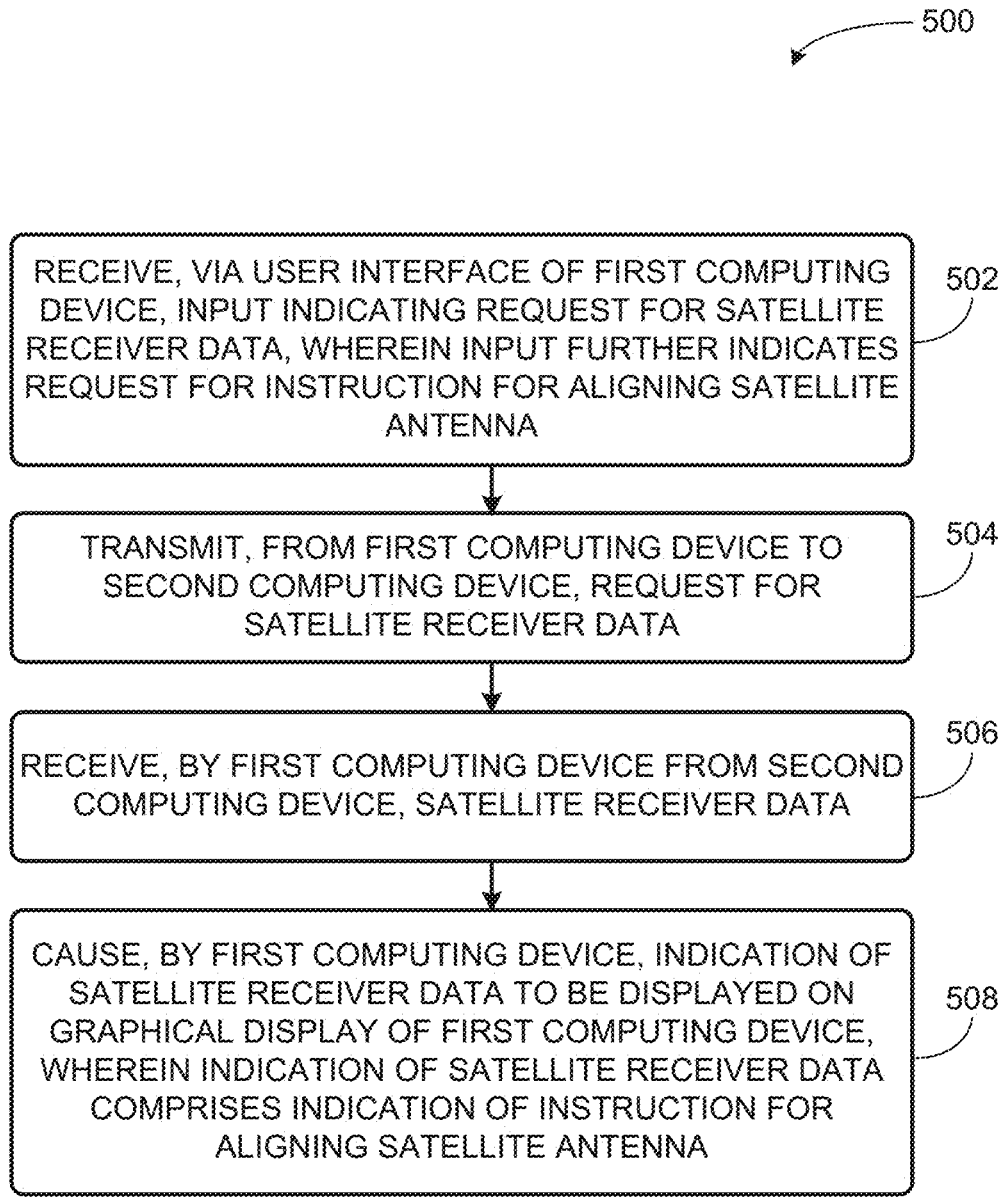
FIG. 5 is a flow chart according to an example embodiment.

FIG. 5 is a flowchart 500 illustrating operations for facilitating the remote display of satellite receiver information via the graphical display of a computing device. The following paragraphs generally discuss examples involving the display of satellite receiver information to facilitate the installation and alignment of an ODU, however the satellite receiver data may also be used for the verification of signal quality, troubleshooting problems, or for numerous other applications where information about satellite downlink reception is necessary.

At block 502, a first computing device may receive, via a user interface of the first computing device, an input indicating a request for satellite receiver data. The first computing device may be, for example the computing device 400 shown in FIG. 4, and may further correspond to the user device 110 shown in FIG. 1. The input may take a number of forms. For example, the input may be a user input to the first computing device 400 such as a selection with an input device such as a keyboard or mouse, a touch on a touchscreen, a voice command, or a gesture command, among other examples.

Similarly, the indication of the request for satellite receiver data may take various forms. For instance, the input may indicate an HTTP request, such as a request for a webpage containing the satellite receiver data. Numerous other protocols for requesting and hosting information may also be used. As another example, the input may indicate a command to launch an application on the first computing device 400, such as an ODU alignment application, that requests the satellite receiver data. Other examples are also possible. The requested satellite receiver data may be one or more of a signal power measurement from one or more satellites, a signal-to-noise ratio, or a signal lock status, among other data.

Further, the input received via the user interface of the first computing device 400 may indicate a request for an instruction for aligning a satellite antenna, such as the antenna 128, or ODU 128, shown in FIG. 1. The installation of the ODU 128, may involve accurately aligning the ODU 128 in an orientation that allows for the highest signal strength from the satellites. For instance, the alignment may be based on a combination of an azimuth angle, an elevation angle, and a tilt angle for the ODU 128. Accordingly, the input may indicate a request for an instruction regarding the angle at which to point the ODU 128.

In some examples, the request for the satellite receiver data may include a request to control the satellite receiver, such as a request to control a tuner of the set-top box (STB) 106. For instance, the request to control the tuner may be a request to tune to a satellite transponder, or to perform a measurement, such as a measurement of the signal power being received by the satellite receiver. Other examples are possible as well.

During the alignment of the ODU, it may be desirable to receive continuous updates of the measured signal power as the ODU is adjusted. Accordingly, the request for the satellite receiver data may indicate a request for a continuous stream of data that is real-time, or near real-time. This may be accomplished in several ways. For example, the request may be for a continuous and constantly updated data stream that does not stop until a second request to stop the data stream is sent. Alternatively, the request for continuous data may be a loop-based model where the first computing device 400 transmits a first request and waits for a response to the first request, then sends a second request. The first computing device 400 may repeat this cycle until a given task is complete, or an input is received to stop. A request for continuously updated satellite receiver data may take other forms as well.

At block 504, the first computing device 400 may transmit, to a second computing device, the request for the satellite receiver data. The second computing device may be, for instance, the computing device 200 shown in FIG. 2, and may further correspond to the STB 106, shown in FIG. 1. Alternatively or additionally, the second computing device may be the computing device 300 shown in FIG. 3, and may correspond to the server 114 shown in FIG. 1. Other possibilities exist. In either case, the second computing device may be communicatively connected to the ODU 128, perhaps through a coaxial connection in the case of an STB 106, or through the network 112 in the case of the server 114. In the examples that follow, the second computing device corresponds to the STB 106 shown in FIG. 1, and will be referred to as the second computing device 200.

In some examples, the first computing device 400 may transmit the request for the instruction for aligning the ODU 128 to the second computing device 200. Additionally, the first computing device 400 may include one or more sensors that can gather data that may be useful for aligning the ODU. Accordingly, the first computing device 400 may receive sensor data from the one or more sensors, and then transmit the sensor data to the second computing device 200. For example, the first computing device 400 may receive located-based sensor data from a GPS transceiver. The GPS data may then be transmitted to the second computing device 200. Alternatively, the first computing device 400 may receive and then process the GPS data to determine a zip code for the location of the ODU. The first computing device 400 may then transmit the zip code to the second computing device 200.

The first computing device 400 may include other sensors that may be useful for aligning the ODU, the sensor data from which may or may not be transmitted to the second computing device. For example, the first computing device may include a compass that may assist a user in the initial, coarse alignment of the ODU 128. Other possibilities include a cellular or wireless antenna, which may provide location based data, and one or more accelerometers or IMUs, which may drive a level and/or other orientation-based applications that may be useful in coarse alignment or plumbing of the ODU 128. Other possibilities also exist.

The request for the satellite receiver data may be transmitted over any suitable network. For example, the request may be transmitted over a local area network (LAN), such as a home Ethernet and/or WiFi network, that both the first computing device 400 and the second computing device 200 are connected to. In other examples, the request may be transmitted over the internet, particularly when the second computing device corresponds to remote server, such as the server 114 shown in FIG. 1.

At block 506, the first computing device 400 may receive, from the second computing device 200, the satellite receiver data. In some examples, where the request for the satellite receiver data is an HTTP request, such as a request for a webpage, the received satellite receiver data may be in the form of a webpage that is viewable in a web browser. The satellite receiver data may be received via any of the networks discussed above, and other networks are also possible.

Further, where the request for the satellite receiver data includes a request to control the tuner of the satellite receiver, the received satellite receiver data may include a response to the request. For instance, the response may include an acknowledgement that the satellite receiver was tuned as requested. The response may also indicate the measured signal power received by the satellite receiver, where the request was for such a measurement. If a given request to control the tuner could not be completed, the response may take the form of an error message. Other responses are also possible.

In some examples, where the request for the satellite receiver data includes a request for a continuous stream of data, the received satellite receiver data may be a continuous stream of data. The continuous stream of data may be real-time, or near real-time, and may be received by the first computing device 400 in a manner corresponding to the request, such as a constantly updated stream or as a request-response loop, as discussed above. Further, if the request for the satellite receiver data included sensor data from the first computing device 400, the received data may be based on the sensor data. For example, the satellite receiver data may be alignment data for the ODU 128 that is based on the current zip code of the ODU 128.

The satellite receiver data received from the second computing device 200 may also include the requested instruction for aligning the ODU 128. In this case, the instruction may be determined by the second computing device 200 or another computing device. Additionally or alternatively, the first computing device 400 may determine the instruction based on the received satellite receiver data, and the determined instruction may be based on sensor data received from the one or more sensors, as discussed above.

For instance, the first computing device 400 may include an ODU alignment application that may process the received satellite receiver data. The received satellite receiver data may include, for example, a measured signal strength of one or more satellites based on the current alignment of the ODU 128. Based on the measured signal strength, the first computing device may determine an instruction to rotate the ODU 128 in a given direction (e.g., the azimuth direction). As the ODU 128 is rotated, the first computing device 400 may receive updated data, including additional signal measurement for different alignments of the ODU 128. The first computing device 400 may use the multiple measurements to calculate the peak signal value for one or more of the satellites. Based on the calculated peak signal values, the first computing device 400 may determine further alignment instructions, including additional rotations for the ODU 128.

In addition to the facilitating the installation of the ODU 128 via one or more onboard sensors, the first computing device 400 may further provide access to supporting materials such as user guides, reference documents, and instructional videos, among other examples. The materials may be stored in memory on the first computing device 400, for instance, in connection with an ODU alignment application. In other implementations, the supporting materials may be hosted by the second computing device 200, and links may be provided to the supporting materials in a webpage that is displayed by the first computing device 400. Other examples are also possible.

Figure 6A:
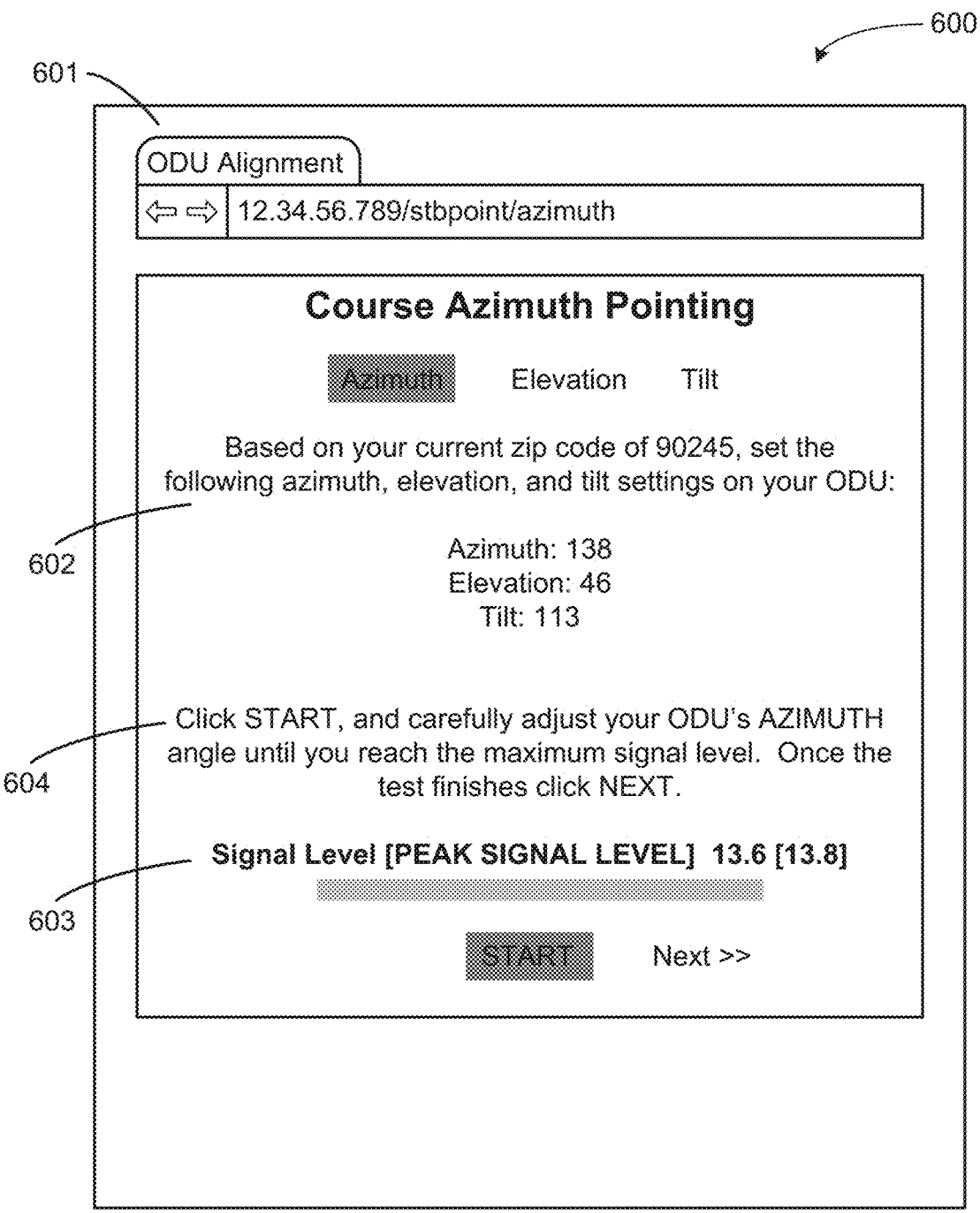
FIG. 6A is a screenshot of a graphical display, according to an example embodiment.
Figure 6B:
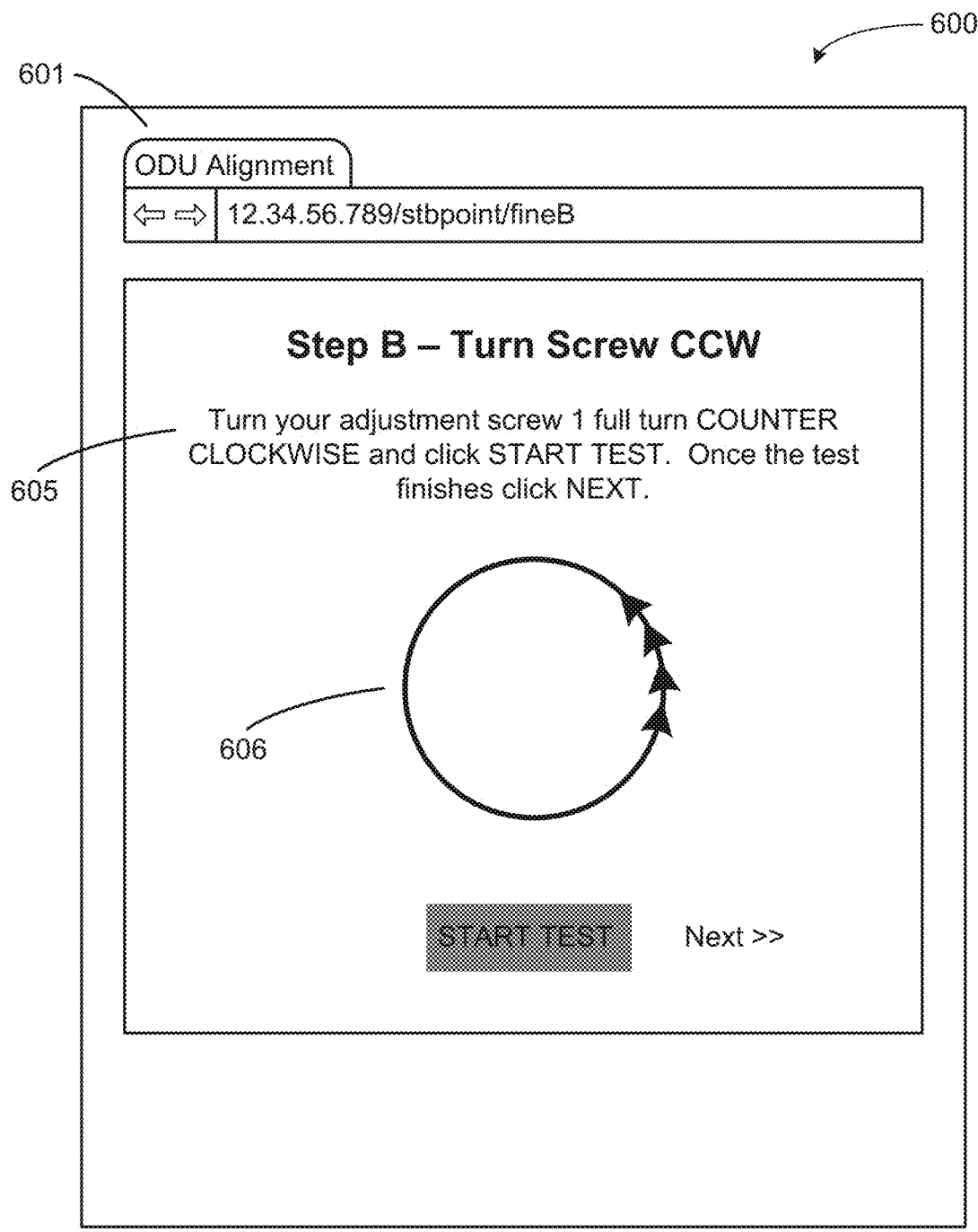
FIG. 6B is another screenshot of the graphical display, according to an example embodiment.
Figure 6C:
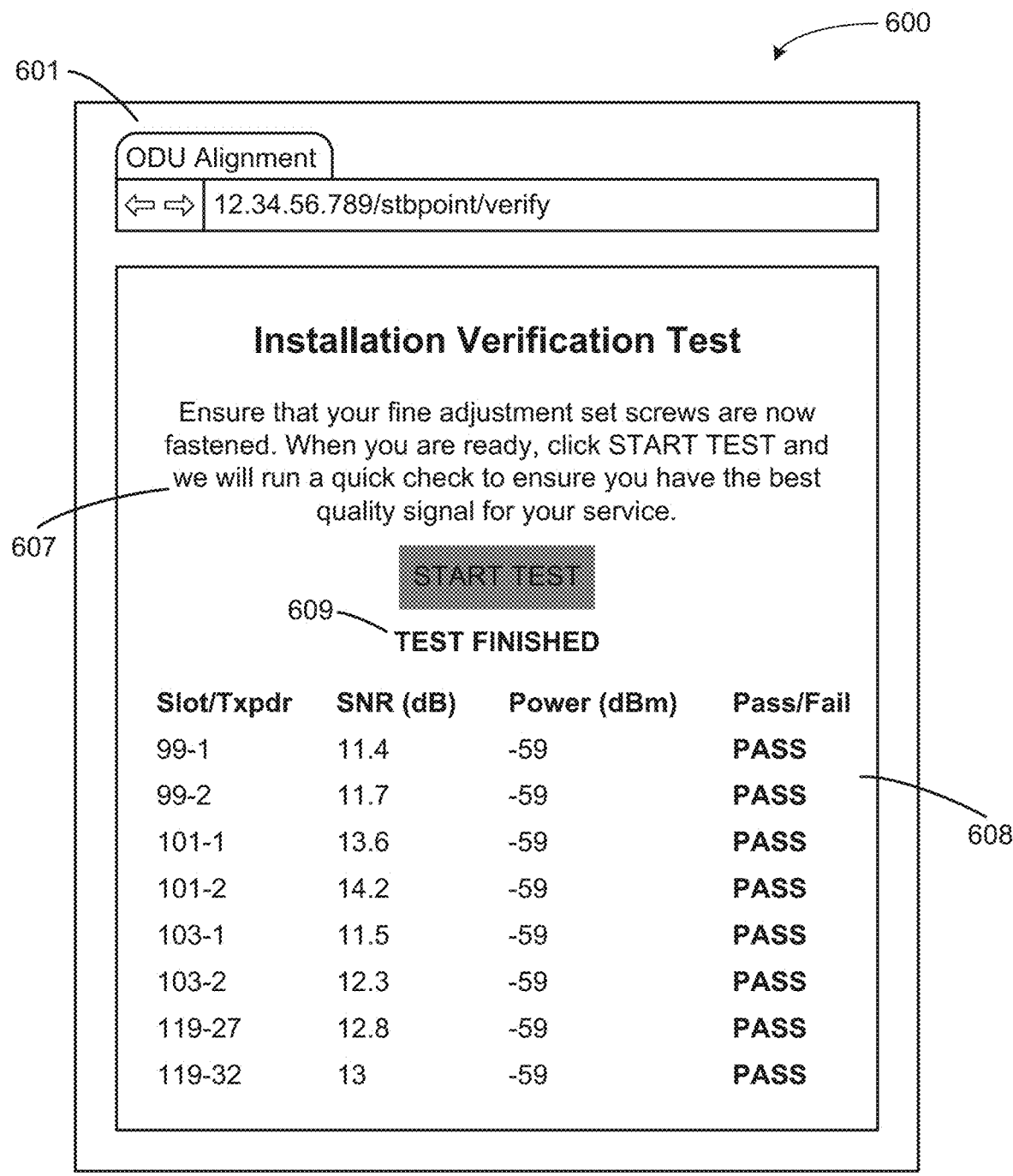
FIG. 6C is yet another screenshot of the graphical display, according to an example embodiment.

At block 508, the first computing device 400 may cause an indication of the satellite receiver data to be displayed on a graphical display of the first computing device 400, and the indication may include the instruction for aligning the ODU 128. FIGS. 6A-6C show examples of a graphical user-interface (GUI) 601 that may be displayed on a graphical display 600 of the first computing device 400. In this example, the satellite receiver data received from the second computing device 200 is in the form of an HTTP webpage, and thus the first computing device 400 causes the graphical display 600 to display the GUI 601 in the form of one or more webpages.

FIG. 6A shows an indication 602 of satellite receiver data that informs a user "Based on your current zip code of 90245, set the following azimuth, elevation, and tilt settings on your ODU." This indication 602 further includes alignment data that may be based on GPS sensor data received from the first computing device 400, as discussed above. Further, the indication 602 includes an instruction for an initial, course alignment of the ODU 128. A user may utilize this information to begin the coarse alignment of the ODU.

FIG. 6A also shows an indication 603 of satellite receiver data that may be continuously received by the first computing device 400. The indication 603 shows the current signal level being measured by the STB 106. Once the user selects "START", as instructed in indication 604, the indication 603 of the signal level may be updated continuously as the user carefully rotates the ODU 128 in the azimuth direction. Other examples and implementations are also possible.

In some examples, the input indicating a request for satellite receiver data may indicate a request for second satellite receiver data. Further, the input may be based on first received satellite receiver data that is already displayed on the graphical display 600, before the input indicating the request for the second data is received. For example, FIG. 6A shows an indication 604 that includes an instruction to "Click START and carefully adjust your ODU's AZIMUTH angle until you reach the maximum signal level. Once the test finishes click NEXT." Thus, the subsequent input of clicking "NEXT", which may indicate a request for further satellite receiver data to continue alignment of the ODU 128, is based on the currently received and displayed satellite receiver data.

After the user completes the course alignment of the ODU 128 in the azimuth direction, the GUI 601 may display a similar instruction for coarsely aligning the elevation of the ODU 128, followed by the coarse alignment of the ODU's tilt. After course alignment is completed, the user may proceed with the fine adjustment of the ODU.

As noted above, and in the related application, the fine adjustment process may begin with a baseline measurement at the ODU's current, coarsely aligned orientation. The baseline measurement may include a first measurement from a set of transponders corresponding to multiple satellites. For this step, the user may simply select an input such as "START TEST" on the GUI 601 and wait for the measurement to finish.

FIG. 6B shows the GUI 601 during the second step of the fine adjustment process. Here, an indication 605 is displayed instructing the user to "Turn your adjustment screw 1 full turn COUNTER CLOCKWISE and click START TEST. Once the test finishes click NEXT." Another indication 606 may be displayed on the GUI 601 showing the a representation of the direction that the screw should be turned. Accordingly, the user may turn the adjustment screw 1 full turn and click START TEST. A second measurement for the set of transponders may be obtained at the second orientation of the ODU 128, and when the test is finished, the user may click NEXT to move to the next step.

A number of similar instructions may follow, instructing the user to turn the adjustment screw a prescribed number of times in a given direction, either clockwise or counter clockwise. Each time, a measurement may be obtained at the given orientation of the ODU 128, which may be used to determine the peak angle for each satellite. From the set of peak angles, the average peak angle for the ODU alignment may be determined.

Based on the determined, average peak angle for the ODU, and the known turns of the adjustment screw between measurements, the first computing device 400 (or another computing device) may determine a final fine adjustment instruction. In some cases, the final fine adjustment instruction may be to turn the fine adjustment screw a fraction of a full turn in a given direction. For example, based on the determined average peak angle and the current orientation of the ODU 128, the final fine adjustment instruction may be to "Turn your adjustment screw 0.72 turns COUNTER CLOCKWISE. Once you have done this, click NEXT."

Accordingly, the user may turn the fine adjustment screw 0.72 turns counter clockwise, and thereby complete the fine adjustment of the ODU 128. Upon clicking "NEXT", the GUI 601 may display an Installation Verification Test page, an example of which is shown in FIG. 6C. For instance the GUI 601 may display an indication 607 instructing the user to "Ensure that your fine adjustment set screws are now fastened. When you are ready, click START TEST and we will run a quick check to ensure you have the best quality signal for your service."

After the user clicks START TEST, the GUI 601 may additionally display an indication of the test results. For example, the indication 608 shown in FIG. 6C indicates a given satellite by its orbital slot (e.g., 99°, 101°, etc.) and its transponder, and further indicates measurements corresponding to the satellite transponders, such as a signal-to-noise ratio and a signal power. Further, the indication 608 may indicate whether the measured values are sufficient, which may be based on the previously determined peak values for each given transponder, or some other metric. In FIG. 6C, each of the transponders is indicated as "PASS", and thus the GUI displays an indication 609 indicating "TEST FINISHED".

In some examples, if one or more of the transponders does not pass the Installation Verification Test, the GUI 601 may instruct the user to repeat one or more of the previous steps, in an attempt to more finely align the ODU 128.

B. Second Example Method for Remote Display of Satellite Receiver Information

Figure 7:
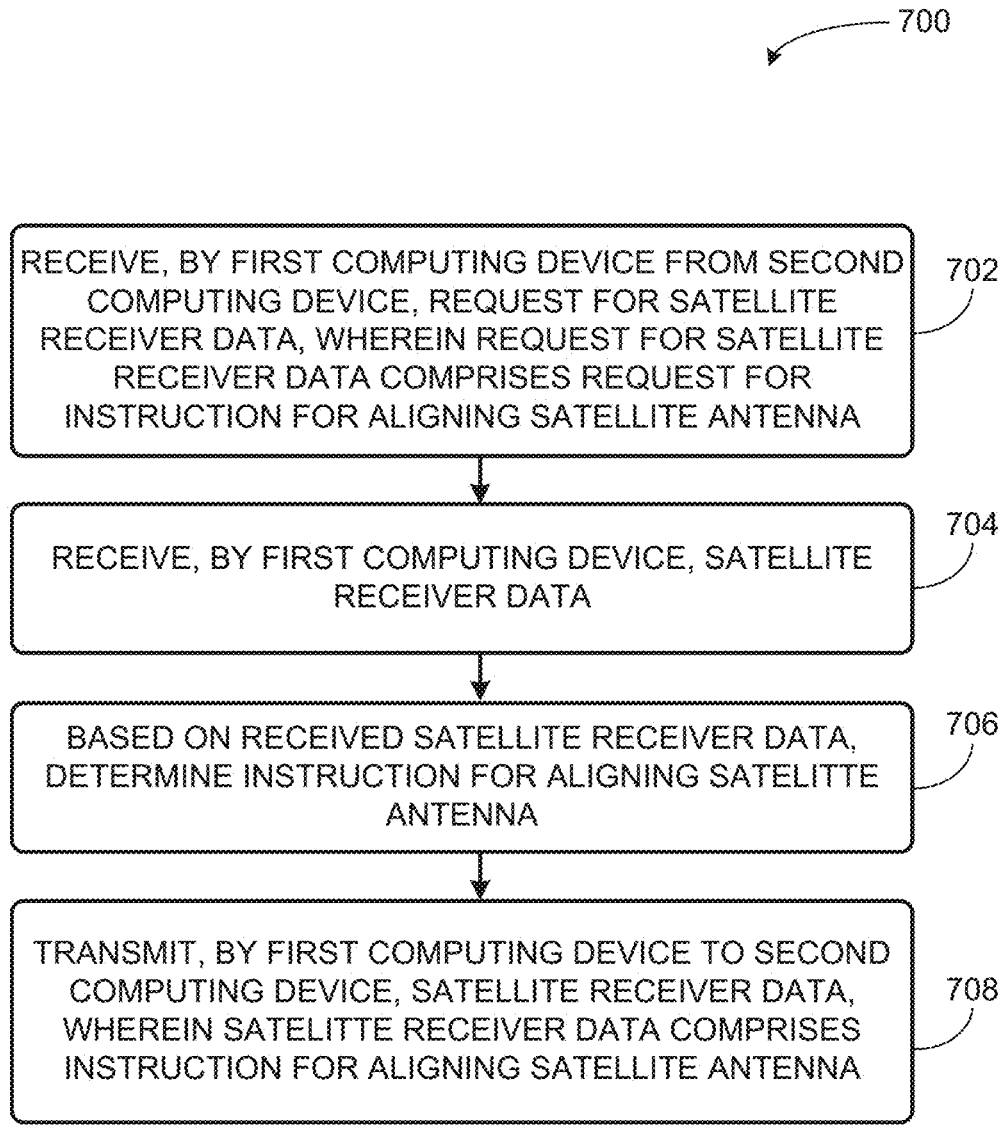
FIG. 7 is a flow chart according to an example embodiment.

FIG. 7 is a flowchart 700 illustrating operations for facilitating, by a first computing device, the remote display of satellite receiver information via the graphical display of a second computing device. The following paragraphs generally discuss examples involving the display of satellite receiver information to facilitate the installation and alignment of an ODU, however the satellite receiver data may also be used for the verification of signal quality, troubleshooting problems, or for numerous other applications where information about satellite downlink reception is necessary.

At block 702, a first computing device may receive from a second computing device a request for satellite receiver data. The first computing device in this implementation may be the computing device 300 shown in FIG. 3, and may further correspond to the server 114 shown in FIG. 1, and may be a web server that exists on the internet, or a non-general-public intranet. For the purposes of the examples that follow, the first computing device 300 is contemplated to be an HTTP server. The second computing device may be the computing device 400 shown in FIG. 4, and may further correspond to the user device 110 shown in FIG. 1. The requested satellite receiver data may be one or more of a signal power measurement from one or more satellites, a signal-to-noise ratio, or a signal lock status, among other data.

The request for the satellite receiver data may include a request for an instruction for aligning a satellite antenna, or ODU 128. This may include a request for an instruction regarding the angle at which to point the ODU 128, as discussed above with respect to flowchart 500.

In some examples, if the requested satellite receiver data is already cached on the first computing device 300, the first computing device 300 may transmit the requested data to the second computing device 400. Additionally or alternatively, the first computing device 300 may transmit the request for satellite receiver data to the STB 106 via the network 112. Further, as discussed in some of the examples above, the request for the satellite receiver data may include a request for a continuous stream of satellite receiver data. In this case, the first computing device may transmit an in-kind request to the STB 106.

In some cases, the request for the satellite receiver data may include a request to control the satellite receiver, such as a request to control a tuner of the STB 106, as discussed above. In this case, the first computing device 300 may validate the request to control the satellite receiver. For example, the second computing device 400 may need to be properly registered, or associated with a particular STB 106, before it can makes requests to control the STB 106. Accordingly, the first computing device 300 may verify that the request originated from a trusted device.

Further, the first computing device 300 may transmit the request to control the satellite receiver. For example, the first computing device 300 may transmit the request to the STB 106, and the STB 106 may receive the request via a network stack, or network interface. A middleware application within the STB 106 may then translate the request and may send it to a common driver interface (CDI) layer. The CDI layer may interpret the request, and then pass the request to the ODU 128. In this way, the first computing device 300 may be communicatively connected to the ODU 128. The ODU 128 may transmit a response to the request to the STB 106, which may then be transmitted back through the CDI and middleware layers and then received by the first computing device 300. The response may take a number of forms, as discussed above.

At block 704, the first computing device 300 may receive the satellite receiver data. For example, the first computing device may receive the satellite receiver data from the STB 106 via the network 112. The first computing device 300 may then cache the data to be transmitted to the second computing device 400, used for ODU alignment calculations, other calculations, logging, or other measurement purposes.

In some implementations, the first computing device 300 may, in response to receiving the satellite receiver data, generate a webpage that may contain one or more indications of the satellite receiver data. Accordingly, as the first computing device 300 receives HTTP requests for the satellite receiver data, the first computing device 300 may transmit the webpage. Further, the webpage may be updated as the first computing device 300 receives updated satellite receiver data from the STB 106.

At block 706, the first computing device 300 may, based on the received satellite receiver data, determine the instruction for aligning the ODU 128, as discussed above with respect to flowchart 500. In some cases, the request for satellite receiver data may include sensor data from the second computing device 400. In such an example, the determined instruction for aligning the satellite antenna may be based on the sensor data from the second computing device 400, as noted above.

At block 708, the first computing device 300 may transmit the satellite receiver data to the second computing device 400, and the satellite receiver data may include the instruction for aligning the ODU 128. For example, the first computing device may transmit the generated webpage that includes indications of the satellite receiver data. Further, the first computing device may transmit a continuous stream data. Other examples are also possible. The second computing device 400 may then cause the webpage or other indication of the satellite receiver data to be displayed, as discussed above and shown in FIGS. 6A-6C.

The preceding examples have assumed that the first computing device 300 corresponds to the remote server 114 as shown in FIG. 1. However, in some implementations, the first computing device described with respect to flowchart 700 may be the computing device 200, and may further correspond to the STB 106 shown in FIG. 2. For example, the STB 106 may include an embedded server that performs operations that are substantially the same as those discussed above with respect to the external server 114.

For instance, the embedded server may replace the middleware application discussed above, and may transmit requests directly to the CDI later of the STB 106. The embedded server may also utilize existing hardware, such as the processor(s) and memory, of the STB 106. Further, the embedded server may allow for the ODU alignment application to be self-contained and operate without external dependencies. Additionally, the embedded server may have a more direct communications link with the requesting computing device, such as the user device 110, which may be on the same local network as the STB 106.

On the other hand, the externally hosted application as discussed above may allow for simpler updates to the ODU alignment application if changes need to be made. As noted above, satellite downlinks change over time. Updating the ODU alignment application on the external server 114 in a single, centralized location may be easier than pushing an update to all STBs in the communications system 100. Further, the memory footprint and processor demand for the middleware application used to interpret the requests may be smaller than that of a fully embedded server. Security may also be more tightly controlled if the STB 106 and the external server 114 are maintained as separate systems.

It is further contemplated that a portion of the ODU alignment application may be hosted on the second computing device 400, corresponding to the user device 110. For example, a user device 110 such as a smartphone may download an application that may include the satellite downlink information. This information may be updated as necessary via an update to the downloaded application. Based on satellite receiver data received from the STB, the user device 110 may determine the instructions for aligning the ODU 128 and may display them on the graphical display of the user device 110. This implementation may allow either an internally or externally hosted server to allocate the operations at block 706, if the server detects that the user device 110 is running an up-to-date ODU alignment application. Accordingly, the server may allocate a portion of the processor demand for the ODU alignment to the user device 110.

Due to the advantages of both internally and externally hosted server examples discussed herein, the communications system 100 may include one of these implementations or a combination of both. That is, some STBs within the communications system 100 may include an embedded server hosting the full ODU alignment application. Other STBs may not include the fully embedded server, and may rely on the externally hosted server 114.

IV. Conclusion

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method, comprising:
   obtaining, by a first processing system comprising a processor, satellite receiver data of a satellite receiver, responsive to a request from a second processing system for an instruction to align a satellite antenna, wherein the second processing system is remote from and in communication with the satellite receiver; and
   presenting, by the first processing system, according to the satellite receiver data, the instruction for aligning the satellite antenna at a display device, wherein the instruction for aligning the satellite antenna is based on a satellite antenna angle, wherein the satellite antenna angle is based on an average satellite antenna angle, wherein the average satellite antenna angle is based on a plurality of determined satellite antenna angles for aligning the satellite antenna with at least one satellite of a plurality of satellites.

2. The method of claim 1, wherein the instruction includes an indication to turn an adjustment screw a specified number of times.

3. The method of claim 1, wherein the instruction includes azimuth, elevation, and tilt angles at which to align the satellite antenna.

4. The method of claim 1, wherein the satellite antenna is associated with a third processing system comprising a third processor and the instruction aids a user of the first processing system in aligning the satellite antenna associated with the third processing system.

5. The method of claim 1, wherein the satellite antenna is associated with the first processing system and the instruction aids a user of the first processing system in aligning the satellite antenna associated with the first processing system.

6. A non-transitory machine-readable storage medium, comprising executable instructions that, when executed by a first processing system including a first processor, facilitate performance of operations, comprising:
   receiving, by the first processing system, input indicating a request for satellite receiver data;
   obtaining, by the first processing system, the satellite receiver data;
   determining, by the first processing system, a location of a satellite antenna based on global positioning system (GPS) data obtained by the first processing system from at least one sensor;
   obtaining, by the first processing system, a request for first instructions for aligning the satellite antenna;
   transmitting, from the first processing system to a second processing system comprising a second processor, the request for the first instructions over the Internet, wherein the second processing system is remote from both the first processing system and the satellite antenna;

obtaining, by the first processing system, the first instructions from the second processing system over the Internet, wherein the first instructions are based on the location of the satellite antenna;

displaying, on a graphical display of the first processing system, the first instructions wherein the first instructions are based on a satellite antenna angle, wherein the satellite antenna angle is based on an average satellite antenna angle, and wherein the average satellite antenna angle is based on a plurality of determined satellite antenna angles for aligning the satellite antenna with at least one satellite of a plurality of satellites; and providing, by the first processing system, second instructions to a third processing system in response to determining, by the first processing system, peak signal values from a group of measured signal strengths, wherein the second instructions comprise alignment instructions for the satellite antenna, wherein the satellite receiver data comprises the group of measured signal strengths.

7. The non-transitory machine-readable storage medium of claim 6, wherein the satellite antenna is associated with the third processing system comprising a third processor and the first instructions aid a user of the first processing system in aligning the satellite antenna associated with the third processing system.

8. The non-transitory machine-readable storage medium of claim 6, wherein the satellite antenna is associated with the first processing system and the first instructions aid a user of the first processing system in aligning the satellite antenna associated with the first processing system.

9. The non-transitory machine-readable storage medium of claim 6, wherein the first instructions include azimuth, elevation, and tilt angles at which to align the satellite antenna.

10. The non-transitory machine-readable storage medium of claim 6, wherein the first instructions include an indication to turn an adjustment screw a specified number of times.

11. The non-transitory machine-readable storage medium of claim 6, wherein the first instructions include an indication to turn an adjustment screw a specified direction.

12. A first computing device, comprising:
a graphical display;
a plurality of sensors;
a first processing system including a first processor; and
a memory that stores executable instructions that, when executed by the first processing system, facilitate performance of operations, comprising
receiving, by the first processing system, input indicating a request for satellite receiver data;
obtaining, by the first processing system, sensor data from the plurality of sensors, wherein the sensor data includes global positioning system (GPS) data;
obtaining, by the first processing system, the satellite receiver data;
determining, by the first processing system, a location of a satellite antenna based on the GPS data;
transmitting, from the first processing system to a second processing system comprising a second processor, the sensor data and a request for first instructions for aligning the satellite antenna, wherein the first computing device is remote from the second processing system;
obtaining, by the first processing system, the first instructions, wherein the first instructions are based on the sensor data and the location of the satellite antenna;
displaying, on the graphical display, the first instructions, wherein the first processing system receives the first instructions from the second processing system, wherein the first instructions are based on a satellite antenna angle, wherein the satellite antenna angle is based on an average satellite antenna angle, and wherein the average satellite antenna angle is based on a plurality of determined satellite antenna angles for aligning the satellite antenna with at least one satellite of a plurality of satellites; and
providing, by the first processing system, second instructions to a third processing system in response to determining, by the first processing system, peak signal values from a group of measured signal strengths, wherein the second instructions comprise alignment instructions for the satellite antenna, wherein the satellite receiver data comprises the group of measured signal strengths.

13. The first computing device of claim 12, wherein the satellite antenna is associated with the third processing system comprising a third processor and the first instructions aid a user of the first processing system in aligning the satellite antenna associated with the third processing system.

14. The first computing device of claim 12, wherein the satellite antenna is associated with the first processing system and the first instructions aid a user of the first processing system in aligning the satellite antenna associated with the first processing system.

15. The first computing device of claim 12, wherein the request for satellite receiver data includes the request for the first instructions.

16. The first computing device of claim 15, wherein the request for the first instructions is generated by the first processing system in response to the input.

17. The first computing device of claim 12, wherein the sensors include a location sensor and the sensor data includes location data from the location sensor.

18. The first computing device of claim 12, wherein the first instructions include azimuth, elevation, and tilt angles at which to align the satellite antenna.

19. The first computing device of claim 12, wherein the first instructions include an indication to turn an adjustment screw a specified number of times.

20. The first computing device of claim 12, wherein the first instructions include an indication to turn an adjustment screw a specified direction.

* * * * *